United States Patent [19]
Hickox et al.

[11] Patent Number: 5,555,146
[45] Date of Patent: Sep. 10, 1996

[54] ANTI-ROTATION AIR VANE INERTIA LATCH

[75] Inventors: Thomas A. Hickox, Scotts Valley; Ramgopal Battu, Los Angeles; Lawrence W. Gollbach, Felton, all of Calif.

[73] Assignee: Seagate Technology, Inc., Scotts Valley, Calif.

[21] Appl. No.: 413,927

[22] Filed: Mar. 29, 1995

Related U.S. Application Data

[63] Continuation of Ser. No. 116,919, Sep. 7, 1993, abandoned.

[51] Int. Cl.$^6$ ........................................ G11B 5/54
[52] U.S. Cl. ........................................ 360/105
[58] Field of Search ............................ 360/105, 109, 360/98.07, 99.08, 104–106

[56] References Cited

U.S. PATENT DOCUMENTS

| | | | |
|---|---|---|---|
| 4,647,997 | 3/1987 | Westwood | 360/105 |
| 4,692,829 | 9/1987 | Campbell | 360/105 |
| 5,036,416 | 7/1991 | Mastache | 360/105 |

*Primary Examiner*—Stuart S. Levy
*Assistant Examiner*—Allen Cao
*Attorney, Agent, or Firm*—Flehr, Hohbach, Test, Albritton & Herbert

[57] ABSTRACT

The present invention is a novel latch and air vane system for a disk drive actuator assembly which releases automatically in response to the aerodynamic force generated by the rotation of the storage disk. The latch and air vane system latches and recaptures the actuator assembly and holds the arm and transducer supported thereby in a fixed position. The latch and air vane system comprises a latch journaled for rotation immediately adjacent the disk and including a latch arm extending substantially perpendicular to the direction of movement of the actuator assembly when the actuator assembly is at rest with the transducer resting on the landing zone, a center shaft to allow the latch to rotate, and an air vane. The latch arm has a latch finger at one end thereof engaging a notch on the perimeter of the actuator assembly pivot region. The air vane extending in the opposite direction from the center shaft comprises a flag adjacent the space between the rotating disks and has a flag finger supported near the bottom of the flag and inserted in the region between the disks so that air flow generated by the rotation of the disks presses against the air vane and causes the air vane to move away from the edge of the rotating disks. In this way rotation of the disks causes the latch finger to move away from the notch releasing the actuator assembly for movement of the transducer across the surface of the disk. The latch and air vane mechanism is also intended to withstand considerable shock without allowing the actuator assembly to be dislodged, thereby preventing damage to data storage disks.

14 Claims, 5 Drawing Sheets

ANTI-ROTATION AIR VANE INERTIA LATCH

This is a continuation of application Ser. No. 08/116,919 filed Sep. 7, 1993, now abandoned.

FIELD OF THE INVENTION

The present invention relates to a latch for releasably locking a disc drive actuator at a fixed position during power down conditions. The latch is intended to withstand considerable shock without allowing the actuator to be dislodged, thereby preventing damage to data storage discs having magnetic storage media coated or deposited thereon. More particularly, the present invention relates to an improved latch for a disc drive actuator assembly which releases automatically in response to the aerodynamic force generated by rotation of the storage disc, and which latches and recaptures the actuator arm and holds the arm and transducer supported thereby in fixed position.

BACKGROUND OF THE INVENTION

It is known in the technology that air flow is generated incident to the rotation of data storage discs in a disc drive. The characteristics of the air flow have been analyzed and discussed in the prior art, as for example, U.S. Pat. No. 4,647,997 to Westwood, and in the IBM Journal of Research and Development, November 1974, pages 480–488. It is known that two commonly mounted spaced apart rotating discs generate a significantly greater air flow than generated by a single rotating disc, and that the amount of air flow is also known to be a function of disc diameter and angular velocity. The air flow force is greatest adjacent the periphery of the rotating disc and especially at the region defined between two rotating discs, and fall off rapidly as a non-linear function as one moves away from the disc periphery.

In rotating, non-removable data disc storage devices, a data read/write transducer flies upon an air cushion or bearing in extremely close proximity to the data surface. In many disc drives, including those which are of extremely small size, that transducer lands upon and takes off from a particular predefined landing region. It is possible, when shocks are applied to the disc drive, that the transducer can move or bounce across the surface of the disc, causing erosion or scarring of the magnetic film coating on the disc surface leading to hard and soft data failures. In addition, the hard transducer head may dent the surface in response to sharp jarring forces attributable to sharp or rough handling of the drive.

While aerodynamically actuated latches have been described in the above referenced Westwood patent as well as in U.S. Pat. No. 4,538,193, such latches have not been effective because of a lack of the sensitivity and responsiveness to the limited air flow in extremely small size disc drives to be effective. It has been found that the air flow values in such small disc drives must be carefully accounted for and are, in many cases, too small in magnitude to effectively, reliably and responsibly release the actuator when the discs begin rotation. Further, the spring force that restrains the transducer actuator assembly in the landing zone must be carefully selected so that the force can be overcome when the discs begin to move.

Thus, a need has arisen for a reliable, responsive, air flow responsive latch mechanism responsive to the air flow generated in a small form factor disc drive to reliably latch and release the actuator mechanism, while restraining the actuator against relatively strong shocks.

SUMMARY OF THE INVENTION

A general object of the present invention is to overcome limitations and drawbacks to prior art aerodynamically operated latches for transducer actuated assemblies in a disc drive.

A further object of the invention is to provide an effective aerodynamic transducer latch mechanism within the confines of a miniaturized disc drive structure.

Another object of the present invention is to provide an effective, aerodynamically responsive transducer latch which is capable of reliably holding the actuator arm from uncontrolled movement away from a landing zone position in response to significant shocks of up to 80–100 Gs.

Another object of the present invention is to combine a low cost, low-mass non-electrically powered latch mechanism cooperating with a disc drive actuator arm such that while the mass of the latch mechanism is significantly less than the mass of the actuator arm, the latch mechanism is capable of effectively restraining the arm against movement.

Another object of the invention is to adopt a design of an aerodynamically effective latch mechanism which fits very closely adjacent to or even has parts of the mechanism disposed beneath the rotating disc such that a minimum amount of housing area needs to be devoted to the latch mechanism.

A further object of the present invention is to provide a latch mechanism which when its restraining arm is latched against the actuator arm, provides the restraining force in a direction almost directly parallel to the direction in which the actuator arm will attempt to move so that a maximum restraining force can be applied to the actuator arm.

Another objective of the present invention is to provide a aerodynamically responsive latch mechanism which is incorporated within the confines of the predefined housing without adaptation of the design of the housing to accommodate the latch.

The aerodynamically powered latch of the present invention is incorporated in a disc drive which includes a base casting defining a chamber, and a plurality or at least two rotating data storage discs journaled for rotation relative to the base casting in response to a spindle motor. A transducer actuator assembly is mounted in the chamber adjacent the rotating discs and supports data transducer heads in close proximity to the major data surface of each of the discs, and moves the heads from track to track over the surface of the disc. An innovative latch mechanism is provided comprising a latch journaled for rotation immediately adjacent the disc and comprising a latch arm extending substantially perpendicular to the direction of movement of the actuator arm when the actuator arm is at rest with the transducer resting on the landing zone. The arm has a finger at one end thereof engaging a notch on the radius of the actuator arm pivot region immediately adjacent the center of rotation of the actuator arm: a wind vane support arm extending in the opposite direction from the center of rotation of the aerodynamically powered latch comprises an upright flag member adjacent a space between the two rotating discs and has a finger supported near the bottom of the flag and inserted in the region between the discs so that air flow generated by the rotation of the discs presses against the wind vane and causes the vane to move around its center of rotation away from the edge of the rotating discs. In this way, rotation of the discs causes the latching finger to move away from the notch on the axis of rotation of the actuator arm releasing the actuator arm for movement of the transducer across the surface of the disc.

The aerodynamic latch further includes a coiled spring having at least one end supported from the housing of the disc so that the force of the spring establishes a biasing force of the latching arm of the aerodynamic latch toward the engagement notch on the periphery of the actuator pivot, the force of the biasing spring being defined to be less than the effective force created by the rotation of the discs at normal speed to allow use of the disc drive.

Preferably, the wind vane flag is shaped to follow the contour of the edge of the rotating discs, and has one end extending near to the sidewall of the housing to capture the maximum amount of effective windage generated by rotation of the disc.

In a preferred embodiment of the present invention, a supporting bracket for the aerodynamically powered latch supports the top and bottom of a pin defining the center of rotation of the latch to define a consistently vertical axis of rotation for the latch, the support bracket further including an upright arm adjacent the extending finger of the windage responsive flag so that the wind responsive flag may be mounted immediately adjacent the curved surface of the discs without creating a likelihood of contact between the wind vane and the edge surface of the discs.

Other objects, advantages and features of the present invention will be better understood and appreciated from a thorough consideration of the following detailed description of a preferred embodiment presented in conjunction with the accompanying figures.

DETAILED DESCRIPTION OF A PREFERRED EMBODIMENT

Figure 1:
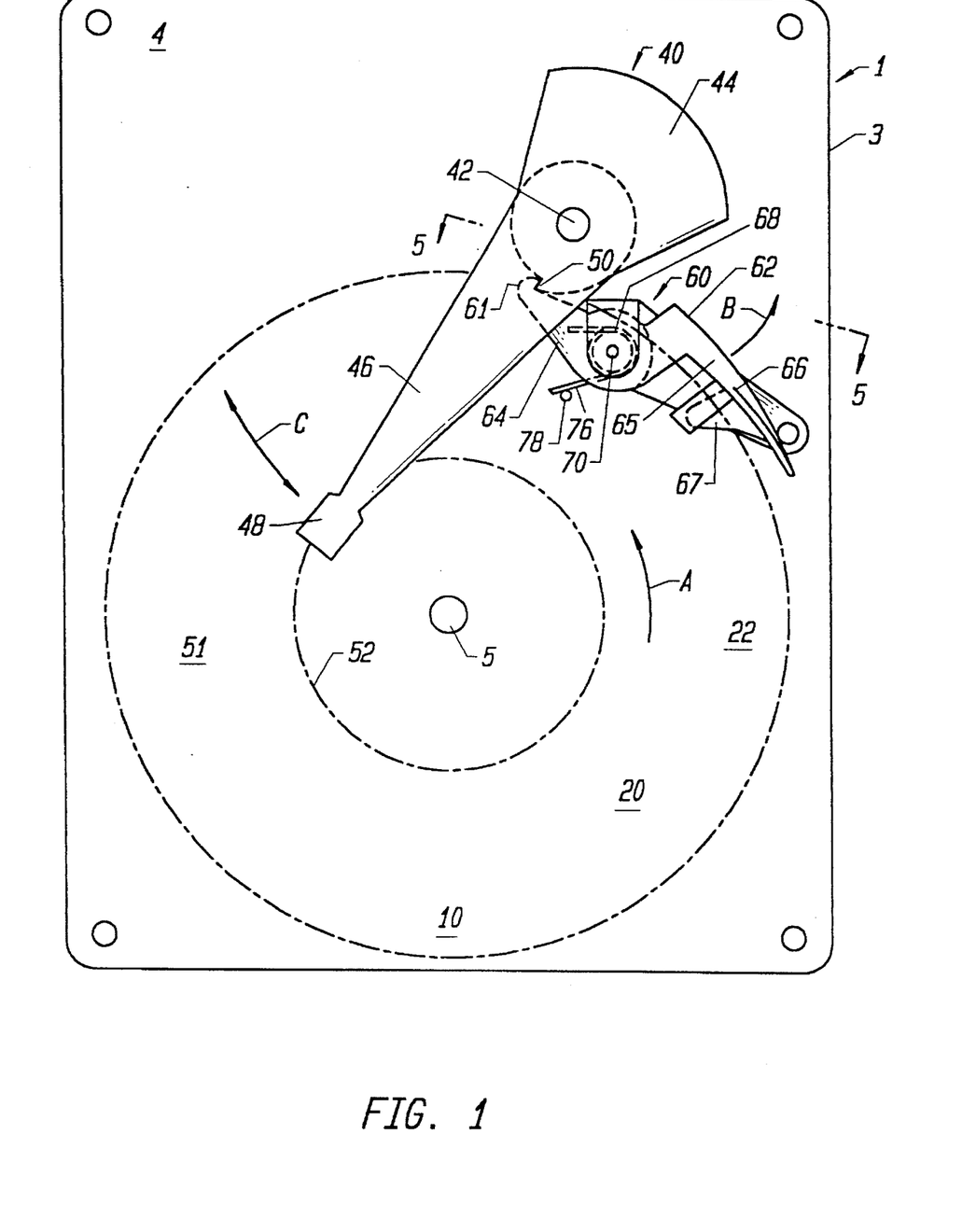
FIG. 1 is a diagrammatic enlarged top plan view of a miniaturized disc drive incorporating the principals of the present invention with the latch being shown in the engaged position.
Figure 2:
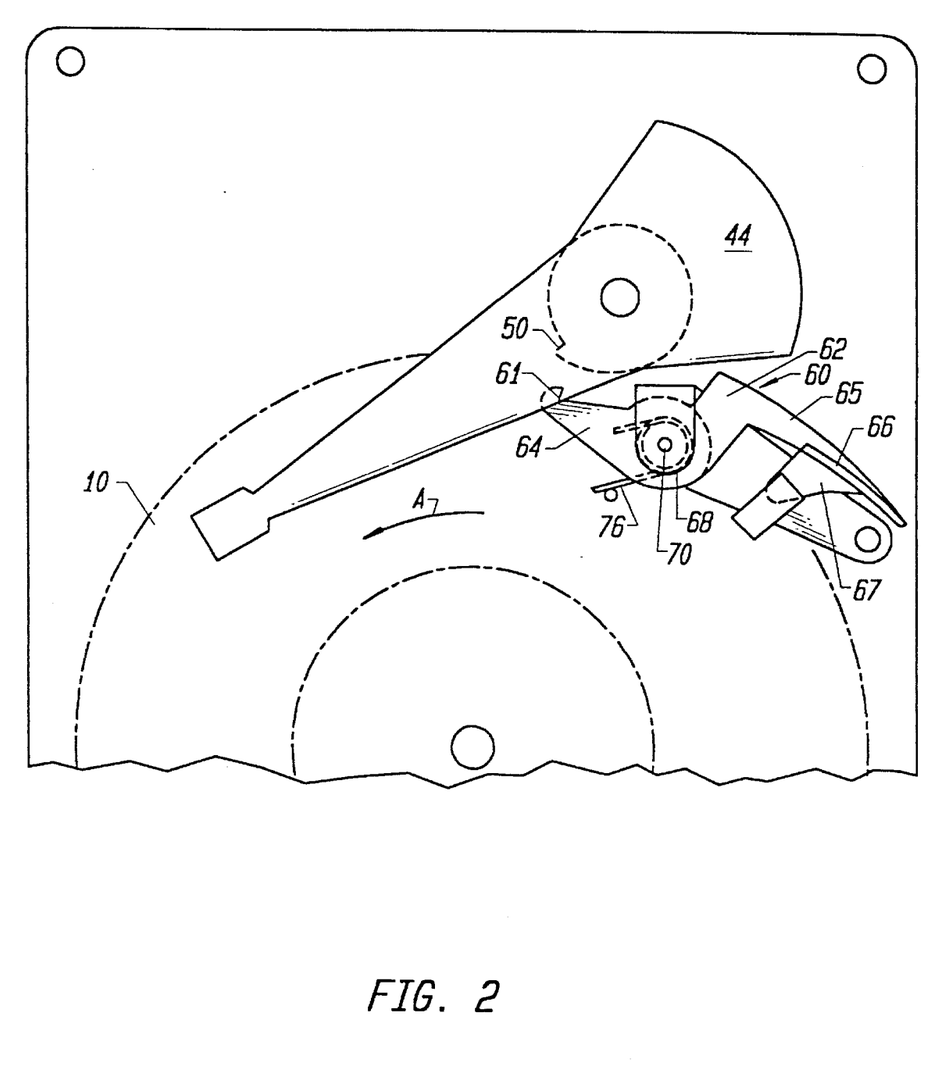
FIG. 2 is a partial top plan view of the disc drive of FIG. 1 with the latch being shown in the disengaged position and the actuator arm having moved the transducer from the landing region of the disc across the surface of the disc.

A miniaturized disc drive 1 constructed in accordance with the principles of the present invention is illustrated in the enlarged plan view of FIG. 1 and the broken away plan view of FIG. 2.

FIG. 1 further shows in a plan view the basic elements of the latch design with the vane in the latched position. This figure should be contrasted with the view of FIG. 2 wherein the disc 10 is spinning in the direction indicated by the arrow A, the spinning disc creating a moving sheet of air which acts against the vane 12 with sufficient force to unlatch the actuator arm.

The disc drive includes a unitary housing 3, and a disc spindle 5 having an axis of rotation indicated at 7. The spindle 5 is coupled directly to an electronically commutated brushless DC spindle motor (not shown) supported from the base casting 4 and rotating at a constant speed to rotate the data storage disc 10 in the direction of the arrow A. The rotation is in a counterclockwise direction as indicated by arrow A, and occurs at a predetermined and constant angular velocity.

The data storage disc 10 provides data storage surfaces on the data storage regions on tracks generally indicated at 20 on the upper and lower surfaces of the disc 10. The surfaces are characterized by the presence of suitable magnetic storage media which may be such materials as are well known in the art which are coated, plated or deposited on the surfaces of the disc. Typically the disc drive is capable of storing at least approximately 40 megabytes of formatted user data on the surfaces 22, 24, 26, 28 of the discs 10, 30, incorporated in the disc drive and shown in the vertical sectional view of FIG. 5.

A rotary actuator arm assembly 40 is provided which is bidirectionally rotatable and is journaled to the base casting 4 about an axis of rotation 42. The actuator 40 rotates bidirectionally in a range of movement along an arc of approximately 30° as indicated by the arrow C in FIG. 1. The arm assembly 40 includes a coil (not shown) adjacently overlying a premagnetized permanent magnet in the region generally indicated at 44. Energization of this coil causes selective movement of the actuator arm along the bidirectional path indicated by arrow C to move a transducer support arm 46.

The transducer support arm 46 extends out over the surface of each disc and supports a transducer slider assembly 48 of the so-called Winchester or flying head type which causes a transducer to fly as close as 15 microinches above the data surface on an air bearing or cushion of air resulting from disc rotation.

The actuator assembly in the embodiment of this invention further includes a notch 50 adjacent the center of rotation of the transducer support 46; this notch is engaged by the latch finger 61 of latch engagement arm 64 of the aerodynamic latch 60 of the present invention to hold the actuator arm 40 in a defined location relative to the disc 10 when the disc drive is not in use. Latch finger 61 is shown in FIGS. 1–5.

Each data storage surface is characterized by multiple, typically 612, concentric annular data tracks. An inner landing zone generally referenced at 52 comprises a region devoted to landing and takeoff of the transducer slider assembly 48. The remaining region of the surface of the disc which comprises the concentric annular data tracks is accurately accessed by movement of the actuator assembly 40 to cause the transducer slider assembly 48 to be located over one of the data tracks. When the disc drive is no longer in use, then the actuator arm, not shown and which are well known in this technology, moves the transducer slider assembly 48 to land over the landing zone 52 and rest on the surface of the disc 10. At this point, the latch engagement arm 64 of aerodynamic latch 60 engages the notch 50 so that in the event of even a severe shock to this small disc drive, the transducer cannot be dislodged and slide across the surface of the disc, causing damage to either or both of the surface of the disc and the transducer.

Figure 5:
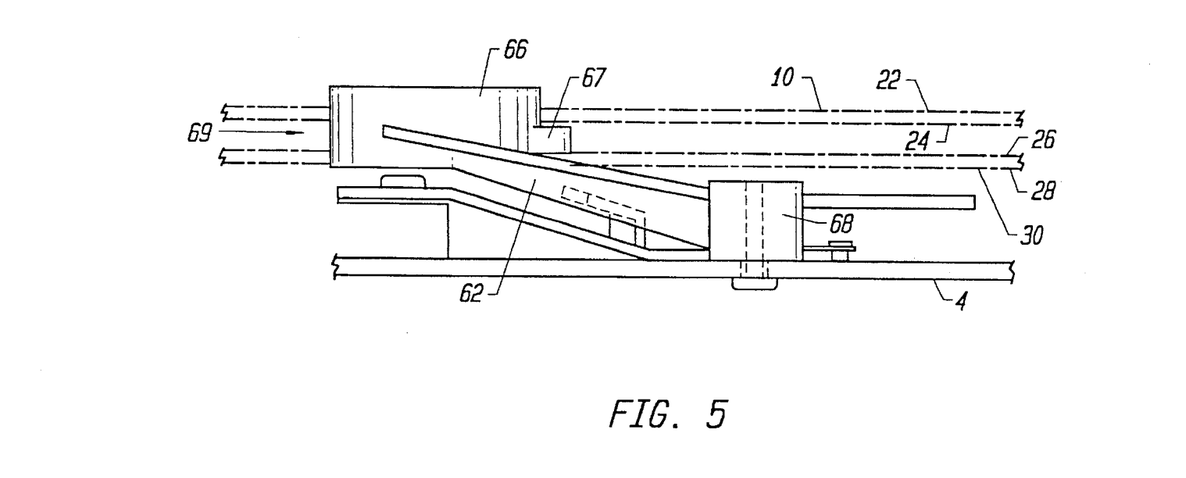
FIG. 5 is a partially sectional elevational view along the line 5—5 of FIG. 1.

The latch 60 is shown in the latched position in FIG. 1, and in the unlatched position where the actuator arm is free to move the transducer from track to track in FIG. 2. As can be seen by comparing the two figures, the latch 60 comprises as its primary moving element a double-ended air vane 62 comprising an engagement or latching arm 64 and a flag arm 65 with an upwardly extending flag 66. The latching arm 64 and rigid flag 66 are at opposite distal ends of the vane 62 which itself is journaled about a post 68 having an axis of rotation 70. Post 68 is in turn fixed to the base casting 4 as shown in FIG. 5. It should be noted that all of these essential elements of the latch are shown clearly in an exploded view in FIG. 3.

Figure 4:
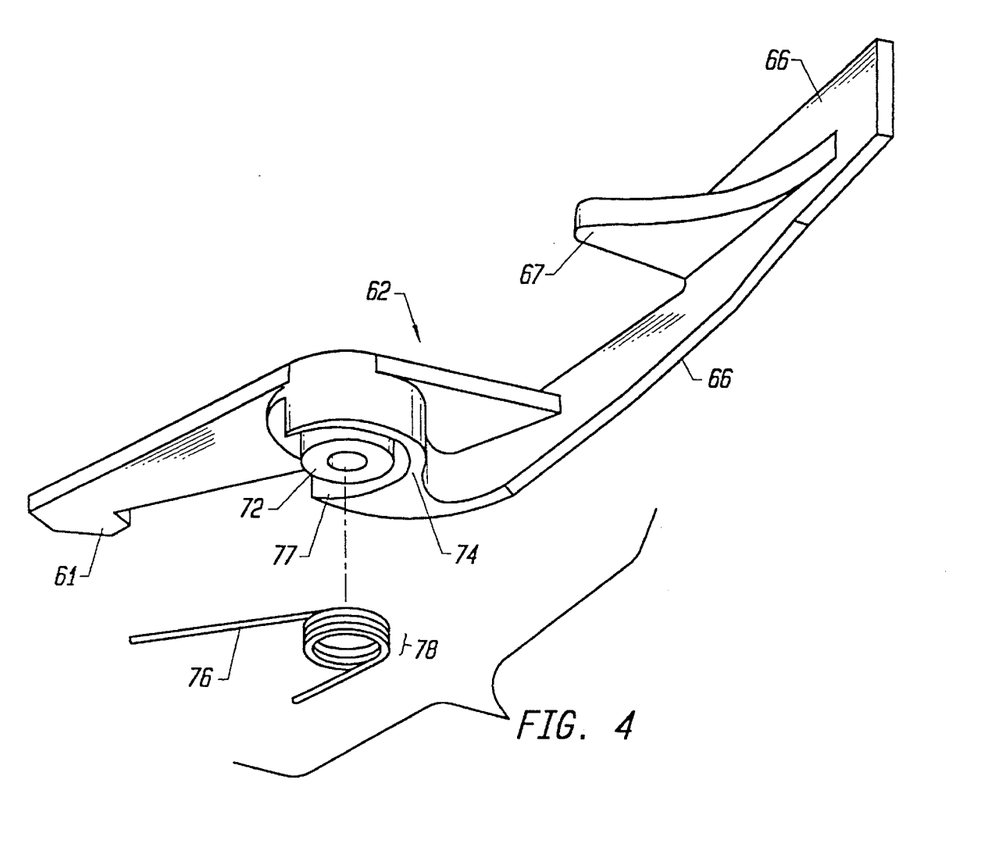
FIG. 4 is an exploded view of the wind vane of the present invention from a different perspective than that shown in FIG. 3 and a biasing spring shown adjacent the wind vane to define the manner in which the spring is mounted within the wind vane.

The latch 60 is journaled about the post 68 by means of a cylindrical shaft 72 shown most clearly in FIG. 4; this allows the latch 60 to move freely as the disc drive is started and stopped.

Specifically, when the disc is rotated in the direction of arrow A, the wind which is generated by rotation of the disc blows against the upright flag 66 supported on flag finger 62, the upright air vane immediately adjacent the discs and supported between the two discs as appears clearly in FIG. 5. The wind is further deflected toward flag 66 by flag finger 67 (see FIGS. 3 and 4 to see relationship of flag finger 67 and flag 66) which is generally horizontal and extends toward and between the discs (see FIGS. 1 and 2). As the discs turn in the direction of arrow A, wind is generated and blows over finger 67 and is deflected upward against flag 66 which is aligned (FIG. 5) with the opening 69 between the discs. As the wind blows against the flag 66, the flag moves in the direction of arrow B, causing the latch engagement arm 64 to move away from notch 50. It is the engagement of latch engagement arm 64 and notch 50 which restrains the actuator slider assembly arm 40 from movement of the transducer 48 away from landing zone 52; as the finger moves in the direction of arrow B, then the air vane 62 and latch engagement arm 64 move away from notch 50 as shown in FIG. 2, releasing the actuator arm to move the transducer slider assembly 48 freely across the surface of the disc in response to commands executed by motor 44.

Means are also provided to bias the latch to the closed, engaged position of FIG. 1 so that engagement of the actuator arm remains secure even in the event of significant shock.

Figure 6:
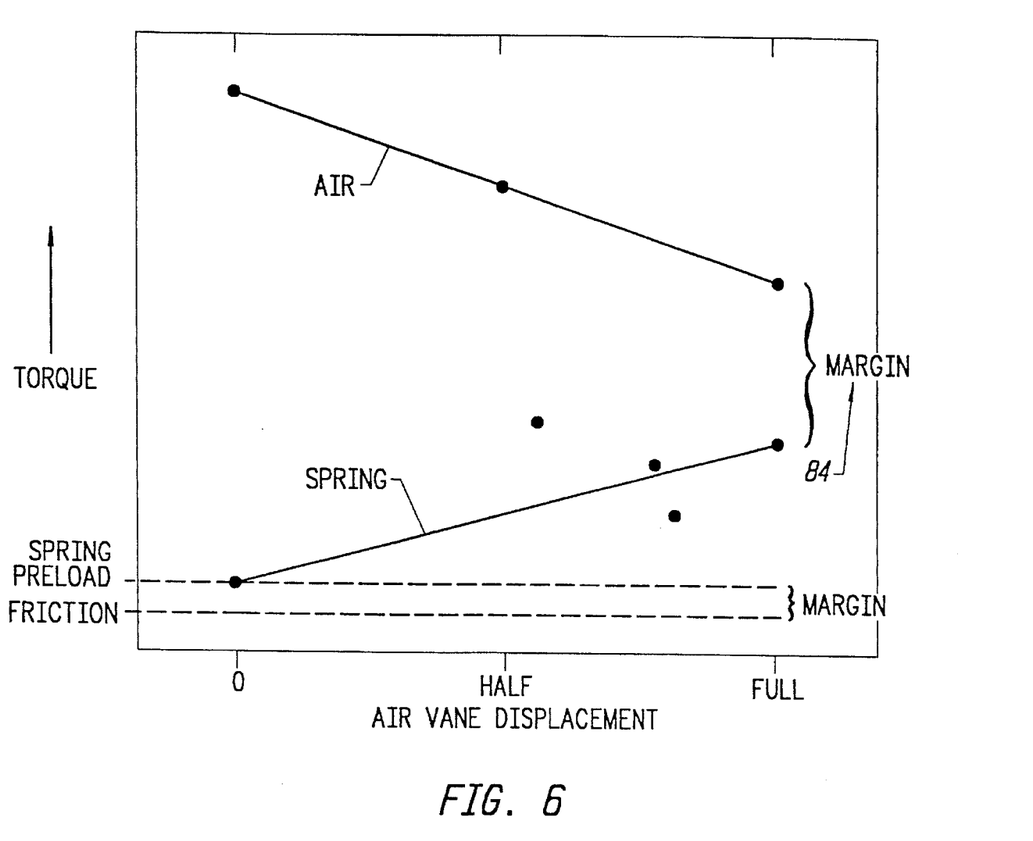
FIG. 6 is a graph depicting the relationship between the torque of the spring and the torque of the aerodynamic wind vane and the relative relationship therebetween in establishing a proper balance of the forces necessary to provide an operative wind vane latch.

As shown most clearly in FIG. 4, a flange 74 is provided surrounding the cylindrical shaft 72 and defining a channel wherein a tightly wound spring 76 is located. This spring, one end of which bears against a post 78 supported from the base of the disc drive, and the other end of which bears against the end of the channel defined above (FIG. 4), is the biasing element which normally biases the wind vane latch towards the closed position shown in FIG. 1. By closed position, it is meant that the latch engagement arm 64 has engaged notch 50; the wind vane flag 66 is closely adjacent the discs 10, 30 of the disc drive; and, actuator assembly 40 has moved transducer slider assembly 48 to landing zone 52. The design constraints which apply to this aspect of the present device are illustrated in FIG. 6, where the countervailing effects of the spring and the air blowing against the air vane flag 66 are graphically displayed. As can be seen, the spring is provided with a certain level of spring preload which together with frictional effects maintain the air vane flag in its closed or home position with the latch engagement arm 64 securely latching the actuator assembly by engaging notch 50. As the discs begin to turn in the direction of arrow A and air moves against the air vane flag 66, the vane is displaced in the direction of arrow B (FIG. 1).

Obviously, for the same speed of rotation of the discs, the further the vane moves from the edge of the disc, the more dispersed the effects of the air blowing against the flag 66; thus the torque of the air against the flag gradually diminishes. By the same token, as the latch engagement arm 64 moves in a direction opposite to arrow B, and away from its latching position, the spring 76 is wound more tightly, increasing the torque exerted by the spring as the spring attempts to restore the actuator 40 to latched or closed position. It is, of course, important to always maintain some margin 84 between available spring torque and wind torque so that the torque of the spring is not entirely overcome; as the wind caused by the turning of the disc ceases to have its effect on the flag, the spring will return the flag to its home position. To maximize the effects of the windage against the flag, especially when the latch engagement arm 64 is engaging notch 50 and some frictional effects between the latch engagement arm and the notch must be overcome, in addition to the force of the spring, that the flag must be positioned overlapping the space between two rotating discs as shown in FIG. 5. The discs focus the air flow against the flag; the flag finger 67 further directs the air flow against the flag to move the air vane 62 in the direction of arrow B.

In summary, as shown in FIG. 4, the spring 76 is retained in a channel 77 defined by the cylindrical shaft 72 and flange 74. The spring has two ends extending outward along arcs at either end of the channel which retains the coiled portion of the spring; the ends are retained by a pin supported from the base casting an edge of the channel 72 for the entire wind vane latch to maintain the proper spring torque.

Figure 3:
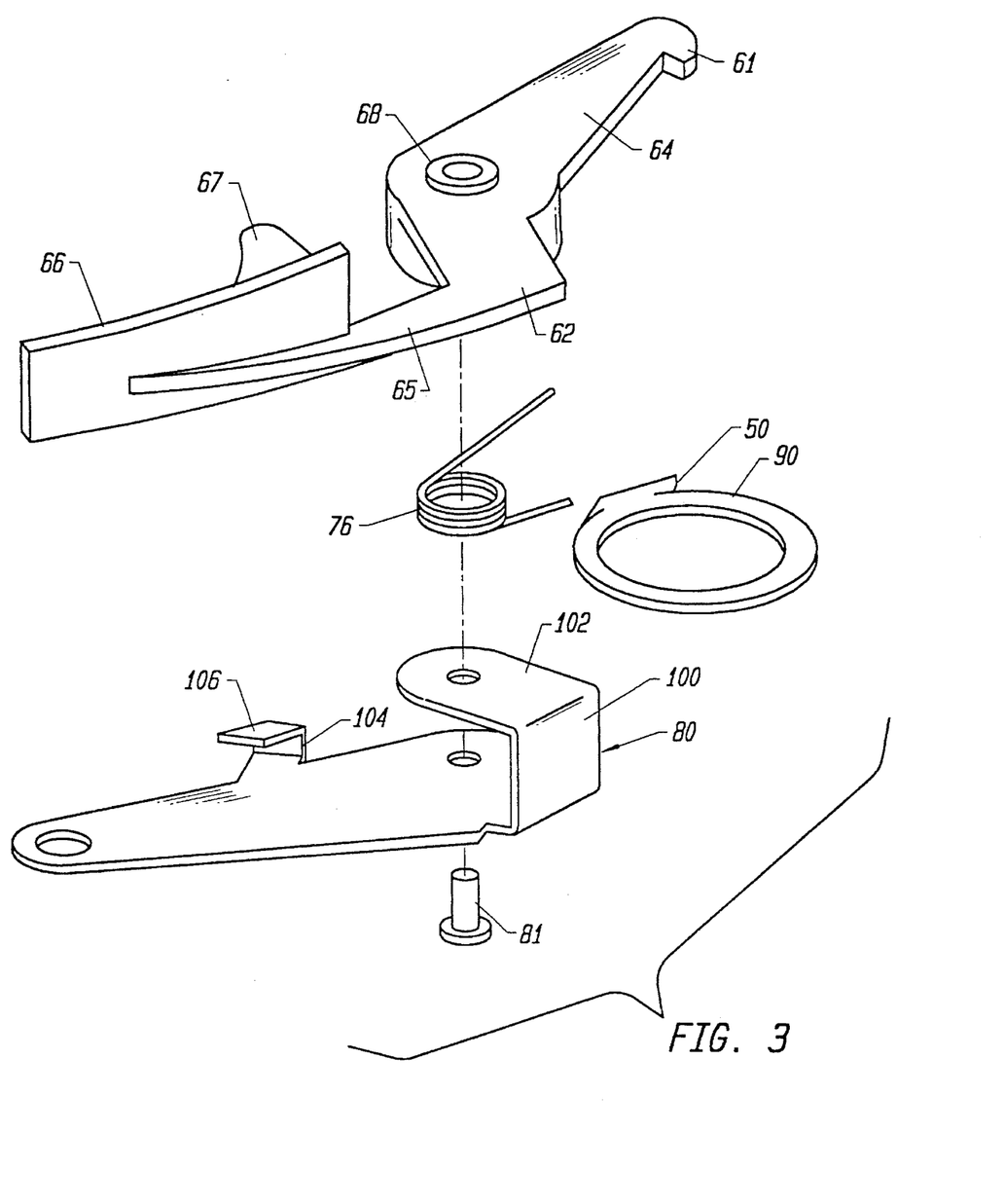
FIG. 3 is an exploded view of the essential portions sections of an effective aerodynamically powered wind vane latch.

Two further significant elements of the present application appear in FIG. 3 and comprise the support bracket 80 and the locking ring 90 which is mounted about the same pivot axis as the actuator arm 40. The support bracket 80 together with the pin 81 which extends up through the base housing casting 4, air vane 62 and bracket over hand 102 cooperate to hold the air vane 62 closely adjacent the side of the rotating discs and define the length of the arc described as the vane rotates toward and away from the discs. The support bracket 80 is formed of a single flat piece of metal which is bent and shaped in three separate regions. As can be seen, an arm comprising upright section 100 and a horizontal vane support section 102 is formed and bent so that the pin which is to be inserted through the air vane 62 extends up through the top of the horizontal vane support section 102. This support structure for the air vane is important because of the necessity of maintaining the vane and especially the flag 66 thereof in a perpendicular plane adjacent the side of the discs.

The air currents generated by the speed of the rotation of the disc are not very great; it is important that their impact upon the vane 62 and especially the flag 66 and air deflection flag finger 67 which extends toward the discs and in fact slides between the discs as is shown in the top view of FIGS. 1 and 2 optimizes the impact of air flow against the face of the wind vane. It can also be seen by looking at the top view of FIG. 1 and considering the effect of air currents against the vane, that the vane 66 is designed to have an arc which substantially parallels the edge of the discs which are rotating past the vane. It also appears from the top plan view of FIG. 1, that it is important not to let the air vane approach too close to the edge of the discs so that it cannot strike against the edge of the discs. Thus, as shown in FIG. 3, a second small arm including an upright portion 104 and in this embodiment an overhang 106 is formed on the support bracket, in a location which would be typically nearly adjacent to where the extending flag finger 67 protrudes from the front of the vane 62. As can be seen from FIG. 1, the leading edge of the air vane flag finger 68 will butt up against the restraining arm 104 as the vane is urged back toward the closed or locked position under the influence of the spring. The vane thus is urged to rest very close to the edge of the disc. The vane does not have to move a very great distance for the latch engagement arm 64 to release from the notch 50 on the locking ring 90; if the vane is very close to the edge of the disc, then the effect of the air currents generated by the rotation of the discs on the vane is maximized, and reliable unlatching of the wind vane latch from the actuator holding notch 50 can be achieved.

As also appears in FIG. 3, the notch 50 is preferably provided along a thin ring 90 which is inserted in the stack which forms the supporting pivot for the actuator arm 40. The ring 90 is inserted in the pivot bore stack below the actuator arm. As appears in FIG. 1, when the latch 60 contacts notch 50, the latch 60 is substantially perpendicular to the lengthwise axis of actuator arm 40 so that the locking force on the arm is maximized.

The operation of the wind vane latch can be summarized as follows. With power removed from the spindle motor mechanism, kinetic energy stored in the rotating discs and spindle is converted to electricity by the spindle motor. The electrical energy produced is applied to the actuator so that it transports the transducer 48 to the landing zone 52 (FIG. 1). When the transducer reaches the landing zone 52, as can be seen, the biasing action of the spring 76, coupled with the fact that the reduced rate of speed of rotation of the disc has reduced the wind force against the wind vane 62, causes the wind vane portion to move opposite the direction of the arrow B, and the latch engagement arm 64 engages the notch 50 (FIG. 1). The transducer is in this manner latched in the landing zone position.

When power to the spindle motor is once again applied, air currents are generated by rotation of the discs in the direction A. As can be seen most readily in FIG. 5, the wind vane is supported directly adjacent the opening between the two discs, so that air currents generated by rotation of the discs impact upon the vane 62 and flag 66, the air being efficaciously directed against the flag 66 by the protruding flag finger 67 which is directed toward the slot between the discs. As a result, the vane moves away from the edge of the discs in the direction of the arrow B (FIG. 1), causing finger 64 to release notch 50. This leaves the actuator arm 40 free to move the transducer slider assembly 48 away from the landing zone 52 and over the surface of the disc.

Having now described an embodiment of the invention, it will be appreciated that the objects of the invention have been fully achieved and could be understood by those skilled in the art that many changes in construction and circuitry and widely different embodiments and applications of the invention will suggest themselves without departure from the spirit and scope of the invention. The disclosures and the description herein are illustrative and are not intended to be in any sense limiting.

What is claimed is:

1. A disc drive, comprising:

an aerodynamically activated latch adapted to cooperate with an actuator arm, the actuator arm rotating around an axis having a means for engaging the latch supported thereon so that the latch secures the actuator arm against rotation during non-operating conditions of said disc drive, said actuator arm being mounted from a base casting of a housing defining a chamber for at least two discs supported for counter-clockwise rotation by a common central shaft, each actuator arm supporting a data transducer in close proximity to major data surfaces of each of said discs and moving said transducer from track to track over a surface of one of the discs in response to commands to an actuator motor;

said aerodynamically activated latch comprising:

a center shaft located immediately adjacent said one of said discs to allow the latch to be journaled for counter-clockwise rotation;

a latch engagement arm, wherein said latch engagement arm extends between two of said discs substantially perpendicular to the actuator arm when the actuator arm is at rest with the transducer resting on a landing zone of said one of said discs, said latch engagement arm extending between two of said discs and having a latch finger at one end thereof engaging a notch on a radius of a pivot region of said actuator arm adjacent a center of rotation of the actuator arm, said notch facing said common central shaft mounting of said discs; and an air vane extending in an opposite direction from said latch engagement arm and from the center shaft, said air vane comprising a flag adjacent a space between two rotating discs, said flag being responsive to an airflow generated by rotation of the discs to rotate in a counter-clockwise direction to cause said latch finger to disengage said notch and release the actuator arm to move said transducer across the surface of said one of said discs so that said latch is effective to hold said actuator arm in the event of shocks in a clockwise or counter-clockwise direction.

2. The disc drive of claim 1 wherein said air vane further comprises a flag finger supported on a side of the flag where said airflow presses against the flag and inserted in a region between two of said discs so that said air flow presses effectively against the air vane and causes the air vane to move around said center shaft away from an edge of rotation of said disc.

3. The disc drive of claim 1 further comprising bias means for biasing said latch finger into engagement with said notch for normally causing said aerodynamically activated leech to engage said actuator arm and prevent movement thereof.

4. The disk drive of claim 3 wherein said bias means further comprises a coil spring having at least one end supported from a housing of the disc drive so that a force of the coil spring establishes a biasing force of the latch engagement arm of the aerodynamic latch toward the notch.

5. The disc drive of claim 4 wherein the force of the coil spring is defined to be less than an effective force of said airflow created by the rotation of the discs at normal speed to allow use of the disc drive.

6. The disc drive of claim 3 wherein said air vane is shaped to follow a contour of the edge of the rotation of said disc, and has one end distal from said center shaft and extending near to a sidewall of a housing of said disc drive to capture the maximum amount of effective force of said airflow generated by rotation of said discs.

7. The disc drive of claim 6 wherein said flag finger extending between said discs has opposing surfaces which, from a section of the flag finger closest to the center of said discs to a section closest to the flag, curve gradually away from each other toward said flag and are thereby shaped to capture and direct said airflow.

8. A disc drive of claim 2 wherein the flag finger is supported near the bottom of the flag.

9. A disc drive of claim 2 further comprising a restraining means for defining an arc of the latch and allowing the flag to be positioned as close to a periphery of said on of said discs without contacting said one of said discs in a closed position.

10. A latch system for use in a disc drive having at least two discs supported for counter-clockwise rotation from a central spindle, comprising:

a notch means on a pivot support of an actuator arm and generally facing said central spindle; and a latch comprising:

a latch engagement arm having a latch finger, the latch finger engaging the notch when the at least two discs are not rotating to prevent rotation of the actuator arm, an air vane having a flag, the flag located at a distance from a center of one of said at least two discs which is greater than a radius of said one of said at least two discs and extending generally along an outer circumference of said one of said at least two discs, an a center shaft coupled to the latch engagement arm and the air vane to permit counter-clockwise rotation of the latch such that, as airflow generated by rotation of said disc presses against the flag, the flag moves away from said one of said at least two and the latch finger disengages from the notch, said latch otherwise being effective to hold said actuator arm against both clockwise and counter-clockwise shocks.

11. A latch system as in claim 10 wherein the air vane further comprises a flag finger located on a side of the flag making contact with the disc rotation-generated air flow and extending parallel to the discs and between two of the discs to guide said airflow toward the flag.

12. A latch system as in claim 11 wherein the flag finger is supported on the surface of the flag close to a base housing of the disc drive.

13. A latch system as in claim 10 further comprising a biasing means for positioning the latch such that, in the absence of the disc rotation-generated airflow, the flag moves toward a periphery of said one of said discs without contacting said one of said discs and the latch finger engages the notch.

14. A latch system as in claim 10 further comprising a restraining means to prevent the flag from contacting said one of said discs.

* * * * *